United States Patent
Garrettson

(10) Patent No.: US 11,384,803 B1
(45) Date of Patent: Jul. 12, 2022

(54) DISC BRAKE PAD SPREADER

(71) Applicant: Jason Garrettson, Avon, CO (US)

(72) Inventor: Jason Garrettson, Avon, CO (US)

(*) Notice: Subject to any disclaimer, the term of this patent is extended or adjusted under 35 U.S.C. 154(b) by 518 days.

(21) Appl. No.: 16/513,997

(22) Filed: Jul. 17, 2019

(51) Int. Cl.
*B23P 19/00* (2006.01)
*F16D 65/00* (2006.01)
*B25B 27/00* (2006.01)

(52) U.S. Cl.
CPC ...... *F16D 65/0043* (2013.01); *B25B 27/0035* (2013.01); *F16D 2250/0084* (2013.01)

(58) Field of Classification Search
CPC ..... B25B 27/00; B25B 27/0035; B25B 5/068; B23P 19/00; B23P 19/04
See application file for complete search history.

(56) References Cited

U.S. PATENT DOCUMENTS

| | | | | |
|---|---|---|---|---|
| 3,835,522 A * | 9/1974 | Ward | ............ | B60T 17/221 29/239 |
| 5,018,261 A * | 5/1991 | Markous | ............ | B25B 27/023 29/266 |
| 6,138,531 A * | 10/2000 | Lamons | ............ | B25G 1/105 81/60 |
| 6,678,931 B1 * | 1/2004 | Tatasciore | ............ | B25B 27/0035 29/239 |
| 7,155,792 B1 * | 1/2007 | Miller, Jr. | ............ | B25B 27/0035 29/239 |
| 8,393,063 B2 * | 3/2013 | Hodges | ............ | B25B 5/068 29/268 |
| 9,309,937 B2 * | 4/2016 | Chen | ............ | B25B 27/0035 |
| 9,657,792 B2 * | 5/2017 | Chen | ............ | B25B 27/023 |
| 2004/0123438 A1 * | 7/2004 | Kang | ............ | B25B 27/0035 29/239 |
| 2004/0134052 A1 * | 7/2004 | Ploeger | ............ | F16D 65/0043 29/239 |
| 2011/0010906 A1 * | 1/2011 | Mitchell | ............ | F16D 65/0043 29/270 |
| 2012/0216380 A1 * | 8/2012 | Chen | ............ | B25B 27/0035 29/267 |

OTHER PUBLICATIONS https://www.lislecorp.com/specialty-tools/disc-brake-pad-spreader, Jun. 7, 2019.

* cited by examiner

*Primary Examiner* — Lee D Wilson
(74) *Attorney, Agent, or Firm* — Gugliotta & Gugliotta LPA

(57) ABSTRACT

An improved brake pad spreader tool has a screw rod separating an impingement plate and an impingement cap. An actuator is affixed to the proximal end and has a polygonal handle portion forming a hand grip and a female receiving socket at a rotational center point of the hand grip. The female receiving socket forms a rectangular recess adapted for attachment to a drive rod of a ratchet wrench or pneumatic impact tool. The instant abstract is neither intended to define the invention disclosed in this specification nor intended to limit the scope of the invention in any way.

8 Claims, 5 Drawing Sheets

DISC BRAKE PAD SPREADER

RELATED APPLICATIONS

There are no previously filed, nor currently any co-pending applications, anywhere in the world.

BACKGROUND OF THE INVENTION

1. Field of the Invention

The present invention relates generally to specialty hand tools and, more particularly, to tools adapted for aiding in the replacement of automotive disc brakes.

2. Description of the Related Art

In the maintenance and repair of vehicle braking systems the need exists for specially design tools. Disc brakes typically include a caliper housing which is mounted adjacent to a wheel. The housing includes opposed disc pads for clamping a disc associated with a wheel of the vehicle. From time to time, it is necessary to replace the pads due to the fact that they wear from frictional contact with the rotating disc. In such circumstances, the caliper housing is typically removed from the wheel assembly of the vehicle, and the disc pads are caused to be spread. The spread pads may then be easily removed and replaced. The caliper housing may then be replaced in the wheel assembly positioned for engagement with the brake disc.

Current specialty tools for aiding such brake pad repairs exist. For example, one such device is a disc brake pad spreader tool, Lisle Product Model No. 24400, available from Lisle Corporation of Clarinda, Iowa. Such a disc brake pad spreader is used for installing pads on domestic and import cars and trucks. The tool compresses the disc brake piston for easy pad installation with a plate having a threaded rod through the center of the plate with a plunger mounted on the end of the rod. The plunger and plate are positioned between the opposed pads of a disc brake caliper and are separable by rotating the threaded bolt or rod which connects the plate and plunger.

Such a device is typical of other equivalent systems that utilized rotation of one or more threaded rods in order to apply separation force to the brake pads. While the use of a screw force works well and has been widely accepted for the repair of disc brakes, in some instances calipers may be hard to separate, thereby making the manual effort required to affect spreading the disc brake pads excessive and difficult.

Consequently, a need has been felt for providing an improved specialty hand tool adapted for aiding in the replacement of automotive disc brakes.

SUMMARY OF THE INVENTION

It is thus an object of the present invention to provide an improved specialty hand tool adapted for aiding in the replacement of automotive disc brakes.

It is a feature of the present invention to provide a disc brake pad spreader that provides a means for leveraging additional force to assist with cranking in the piston on the caliper.

The present invention provides a brake pad spreader tool having a screw rod extending perpendicularly through a threaded receiving coupling. A linearly extended shaft has an exterior male threaded sidewall along a linear length between a proximal terminus and a distal terminus. A first impingement plate forms a rigid rectangular body having a lateral planar surface. A second impingement cap forms a proximal terminus and supporting a flanged surface affixed to the proximal terminus. The cap is slightly pivotable to allow for the impingement face to mate against a vehicle braking system caliper. An actuator is affixed to the proximal end and has a polygonal handle portion forming a hand grip and a female receiving socket at a rotational center point of the hand grip. The female receiving socket forms a rectangular recess adapted for attachment to a drive rod of a ratchet wrench or pneumatic impact tool.

It is an advantage of the present invention to allow for conventional use of a brake pad spreader in a manner currently accepted in the industry.

It is another advantage of the present invention to provide a first alternate means for leveraging additional force to assist with cranking in the piston on the caliper via a conventionally available ratchet wrench.

It is yet another advantage of the present invention to provide a second alternate means for leveraging additional force to assist with cranking in the piston on the caliper via a conventionally available pneumatic impact wrench.

Further objects, features and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
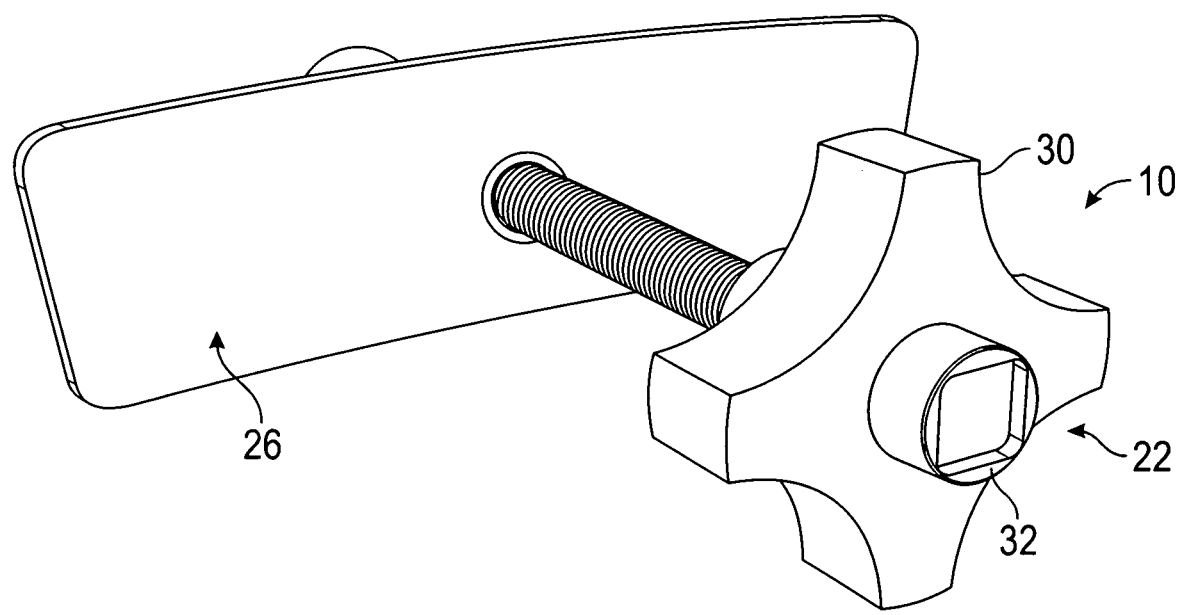
FIG. 1 is a front perspective view of an improved disc brake pad spreader 10 according to the preferred embodiment of the present invention.
Figure 2:
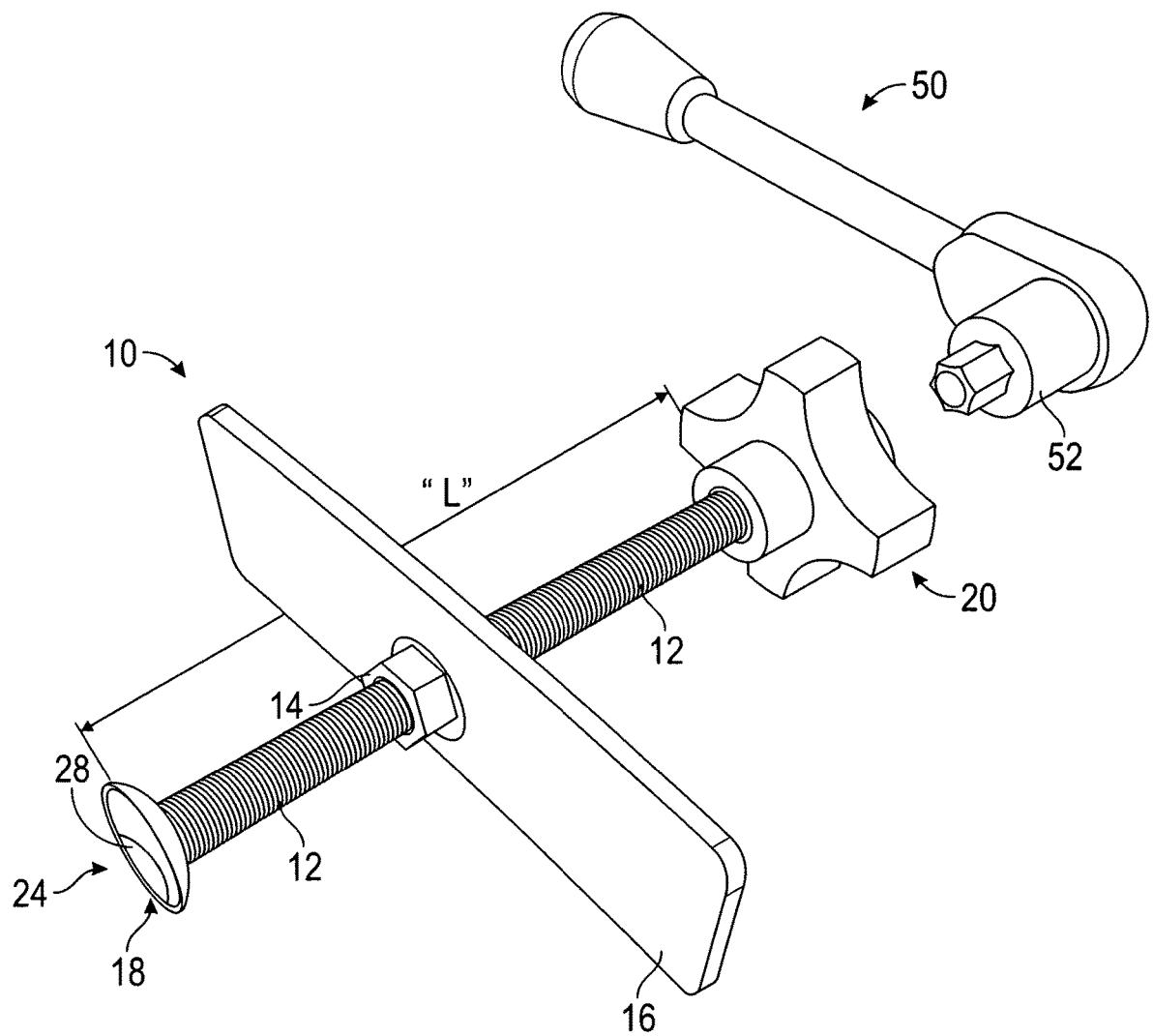
FIG. 2 is a rear perspective view thereof, shown in use with an otherwise conventional ratchet wrench 50.
Figure 3:
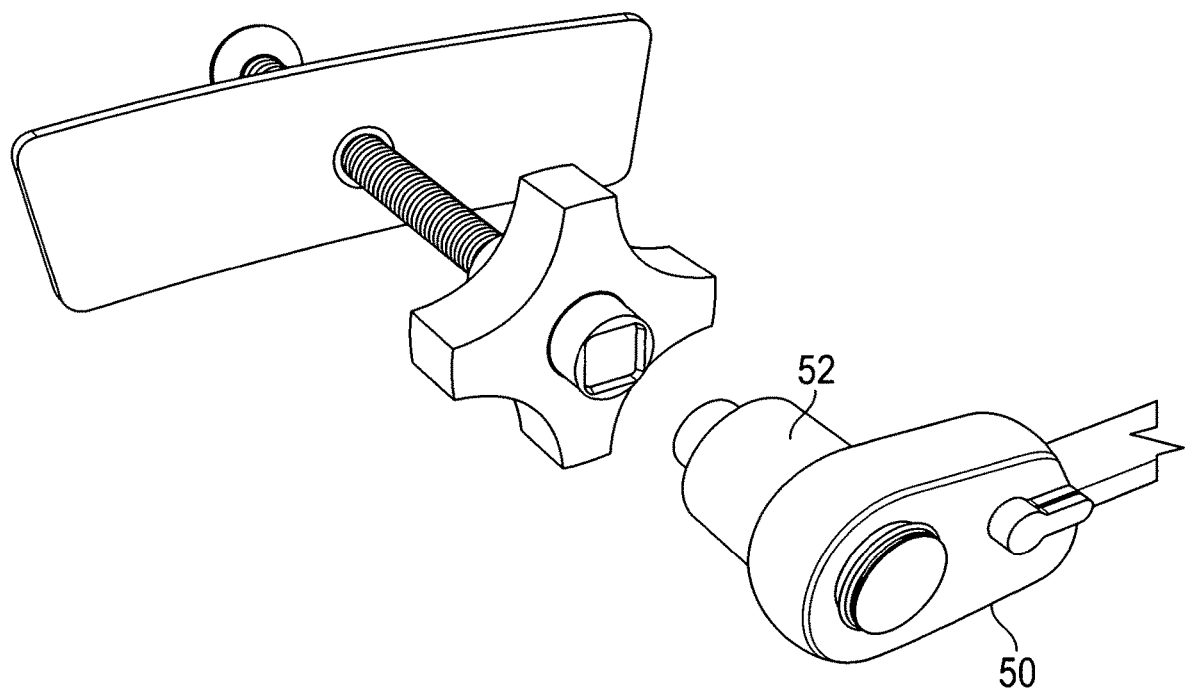
FIG. 3 is a close up front perspective view thereof.
Figure 4:
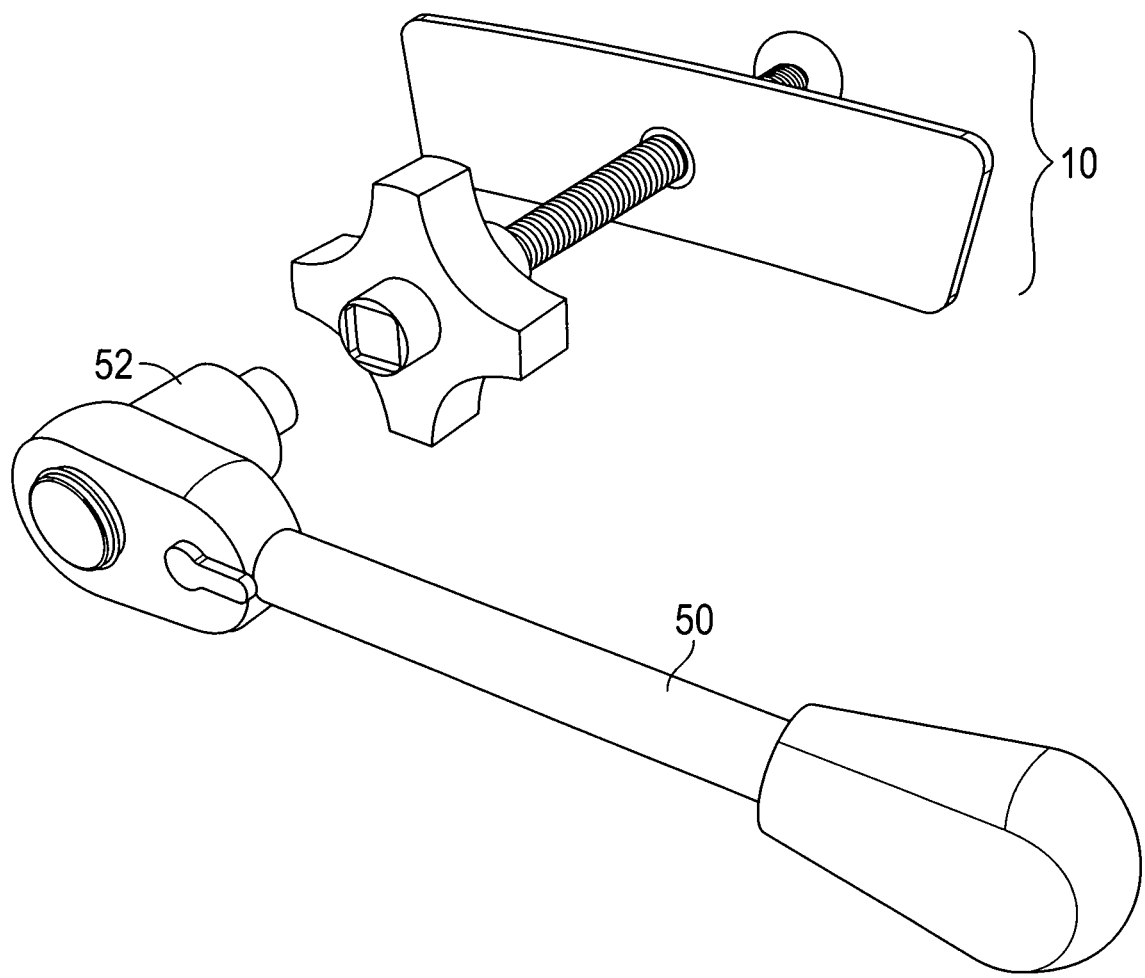
FIG. 4 is a review front perspective view thereof.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to lira it the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, and improved brake pad spreader, generally noted as 10, according to the preferred embodiment of the present invention. The spreader 10 includes a screw rod 12, a threaded receiving sleeve 14, a first impingement plate 16, a second impingement cap 18, and an actuator 20.

The screw rod 12 extends perpendicularly through the threaded receiving coupling 14 and forms a linearly extended shaft having an exterior male threaded sidewall. The screw rod 12 forms a linear length between a proximal terminus 22 and a distal terminus 24. The overall length "L" of the rod 12 may provide a travel length through which a spreading force may be exerted as best described in greater detail below.

The receiving coupling 14 forms a female threaded collar through which the screw rod 12 may be fitted. The receiving coupling 14 may be affixed through the plate 16. In an equivalent alternative the coupling 14 may be formed as a female-threaded orifice directly through the plate 16. In any functional equivalent, it is preferred that the screw rod 12 traverse through the plate 16 at a planar midpoint of the plate 16.

The first impingement plate 16 is a rigid rectangular body adapted for impinging against a vehicle brake disc, as described in greater detail below. It is preferred that the rectangular body 16 be generally planar and support a traverse location for the rod 12 at a general center point of the lateral face 26.

The second impingement cap 18 is formed at the proximal terminus 24 of the rod 12. The cap 18 may be formed directly as part of the rod 12. Preferably, the cap 18 may be formed as a flanged attachment affixed to the proximal terminus. The cap 18 may further be fitted in a rotatable manner that is slightly pivotable to allow for an impingement face 28 to mate against a vehicle braking system caliper as described in greater detail in conjunction with the description of the operation below.

The actuator 20 is affixed to the proximal end 22 of the rod 12 provides a means for leveraging additional force to assist with cranking in the piston on the caliper. The actuator 20 provides a means for leveraging additional rotational force to be applied to the rod 12. Such additional rotational force may assist with cranking in the piston on the caliper, as described in greater detail below. The actuator 20 may include a polygonal handle portion 30 for providing a hand gripping function to provide a first means for application of rotational force. The actuator 20 may further include a female receiving socket 32 at a rotational center point of the handle portion 30. The socket 32 may be shared as a polygonal recess for attachment to a separable hand tool. In a preferred embodiment the socket 32 may be formed of a rectangular recess adapted for attachment to a drive rod 52 of an otherwise conventional ratchet wrench 50. The drive rod 52 may be sized of as a conventional ⅜" drive socket. Additionally, the socket 32 may be adapted for use with and connection to a conventionally available pneumatic impact wrench.

2. Operation of the Preferred Embodiment

Figure 5:
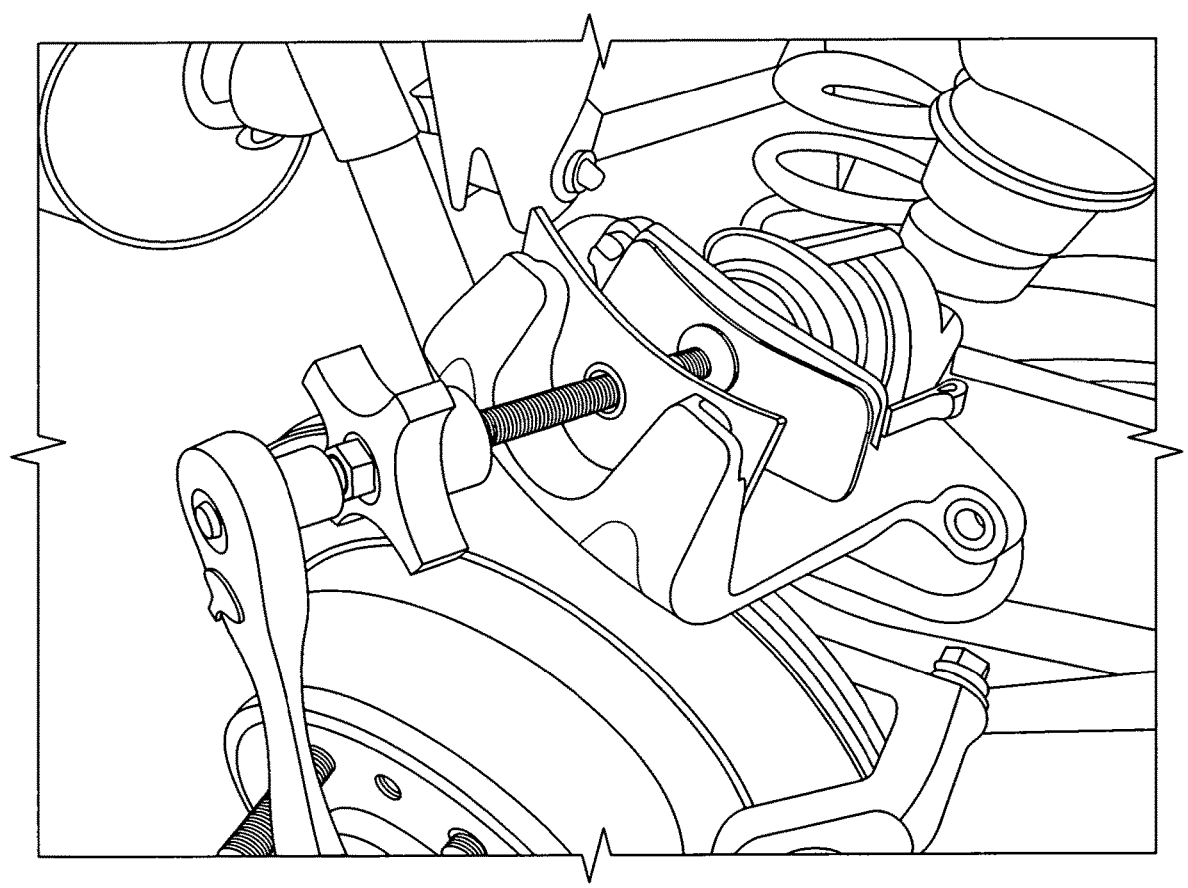
FIG. 5 is a photograph showing an improved disc brake pad spreader 10 according to the preferred embodiment of the present invention shown in use of spreading brake disc pads in a typical automotive braking system.

In operation, as best shown in conjunction with FIG. 5, the spreader 10 is used to aid in the removal of disc brakes of an automotive braking system. The first impingement plate 16 is placed within a caliper housing mounted adjacent to a wheel. The housing includes opposed disc pads which are piston driven toward one another for clamping a rotating disc associated with a rotating wheel of the vehicle to brake or stop the vehicle. The caliper housing may be removed from the wheel assembly of the vehicle. The outboard pad may then be removed and the inboard disc pad mounted in the housing may be caused to be spread apart by rotating the actuator such that the second impingement cap 18 retracts the pad driving piston or pistons into the caliper housing. Alternatively, both pads may be engaged by a spreader 10 tool to affect separation of the worn pads. The pistons which have been pushed back allow adequate room for installation of new pads.

In the event that the user cannot effectuate piston retraction simply by rotating the handle 30 manually, an additional leveraging force may be applied to assist with cranking in the piston on the caliper via a conventionally available ratchet wrench 50. Alternately, or in the event that the manual operation of the ratchet wrench 50 is insufficient, even more leveraging force to assist with cranking in the piston on the caliper may be provided via a conventionally available pneumatic impact wrench.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

What is claimed is:

1. A brake pad spreader tool comprising:
   a screw rod extending perpendicularly through a threaded receiving coupling and forms a linearly extended shaft having and exterior male threaded sidewall along a linear length between a proximal terminus and a distal terminus;
   a first impingement plate forming a rigid rectangular body having a lateral planar surface;
   a second impingement cap formed at the proximal terminus and supporting a flanged surface;
   an actuator affixed to the proximal end, said actuator further comprising:
   a polygonal handle portion forming a hand grip; and
   a female receiving socket at a rotational centerpoint of the hand grip, said female receiving socket forms a rectangular recess adapted for attachment to a drive rod of a ratchet wrench.

2. The brake pad spreader tool of claim 1, wherein said threaded receiving coupling forms a female threaded collar through which the screw rod is fitted traversing the plate at a planar midpoint of the plate.

3. The brake pad spreader tool of claim 1, wherein said flanged surface is formed as an attachment rotatable and slightly pivotable.

4. The brake pad spreader tool of claim 1, wherein said rectangular recess receives a ⅜" drive socket.

5. The brake pad spreader tool of claim 2, said female receiving socket forms a rectangular recess adapted for attachment to a drive rod of a ratchet wrench.

6. The brake pad spreader tool of claim 5, wherein said rectangular recess receives a ⅜" drive socket.

7. The brake pad spreader tool of claim 3, said female receiving socket forms a rectangular recess adapted for attachment to a drive rod of a ratchet wrench.

8. The brake pad spreader tool of claim 7, wherein said rectangular recess receives a ⅜" drive socket.

* * * * *